Patented Mar. 10, 1931

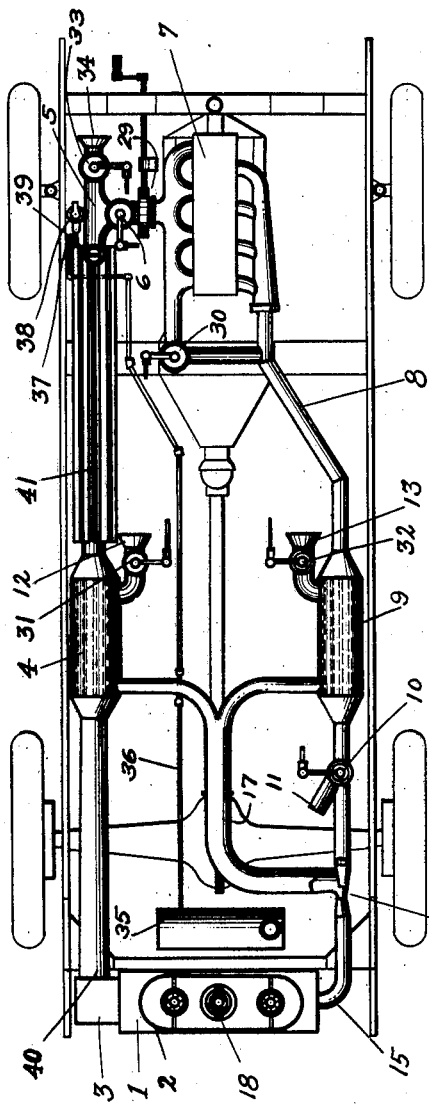
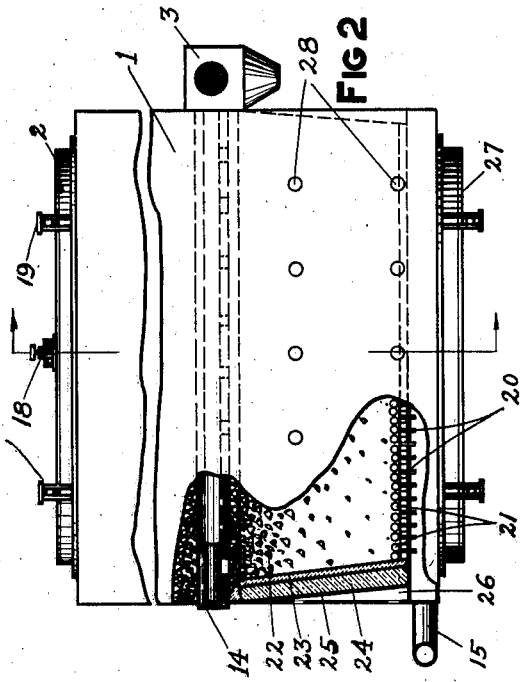
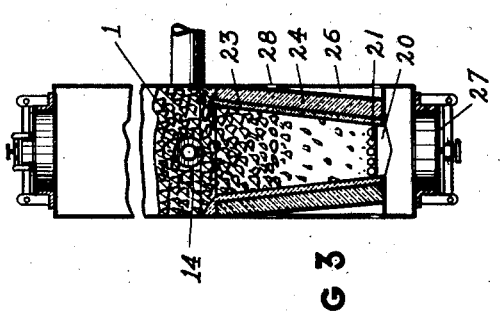

1,795,670

UNITED STATES PATENT OFFICE

WILLIAM W. ODELL, OF SAN FRANCISCO, AND EARL N. PERCY, OF OAKLAND, CALIFORNIA

GAS PRODUCER AND PROCESS FOR MAKING COMBUSTIBLE GAS, CHIEFLY FOR USE WITH AUTOMOTIVE MECHANISMS

Application filed September 30, 1925. Serial No. 59,520.

This invention relates in particular to an apparatus and process for making gas on automotive mechanisms utilizing solid fuel such as charcoal, petroleum coke, coke, briquettes, or other carbonaceous material as the chief source of energy, utilizing substantially the producer-gas reactions.

The objects of this invention are:

(1) To produce a gaseous fuel from solid fuel utilizing the minimum quantity of water.

(2) To utilize the sensible heat of the engine-exhaust gas in the production of gaseous fuel.

(3) To utilize the exhaust gas in endothermic reactions in the gas generator for the triple purpose of keeping the temperatures down in the fuel bed, for recovering some of the combustible gas normally lost in the waste exhaust-gas and for decreasing the water requirements in the operation of the generator.

(4) To utilize the pressure of the exhaust-gas from the engine in supplying gas to the generator.

(5) To provide a heat exchanger for preheating the air supplied generator utilizing the sensible heat of the exhaust gas.

(6) To so preheat the air and gas supplied the generator that a maximum amount of exhaust gas can be supplied the generator fuel and the minimum amount of water.

(7) To provide a producer with a fuel storage magazine above the generator having a capacity greater than double that of the generator proper.

(8) To provide a gas collecting pipe which is cooled by a circulating cooling fluid.

(9) To provide a means for cooling the fluid circulating in the gas offtake, in a radiator.

(10) To provide in a heat exchanger a means for cooling the gas supplied to the engine.

(11) To provide a means for introducing air to the producer through heat exchangers by suction other than by the suction of the engine.

(12) To provide a generator having a wall of refractory material externally insulated with a heat insulating material the whole being jacketed.

(13) To provide a gas producer which can be operated without the introduction of water into the fuel bed, utilizing the exhaust gases as a substitute therefor.

(14) To provide an insulated gas-generator suitable for use on automotive mechanisms in which the insulation thickness varies according to the temperature of the adjacent fuel bed, employing a minimum amount of said insulation.

(15) To provide a gas-producer of light weight and high gas-producing rate.

(16) To provide a substitute for, or type of, grate-bar which will stand up under the high combustion rate of our producer.

(17) To provide means for circulating a maximum amount of exhaust gas from the engine to the producer and into the fuel bed therein.

(18) To provide a means of cooling producer inner shell by natural draft through a jacket.

(19) To provide a generator pot, cushion supported without suspension within an outer insulating jacket, the whole being incased.

(20) To provide a means for supplying an air and gas mixture to an engine, under pressure, being essentially a supercharger, but so connected in the system that a suction can be maintained upon producer and system.

(21) To provide a means for supplying the gas-engine with auxiliary power-gas other than producer gas.

In the ordinary operation of a gas producer it is necessary to use from 0.5 to 1.5 pounds of water injected into the fuel bed, per pound of fuel gasified, chiefly for the purpose of keeping the temperature in the fuel bed within due bounds. In thus using steam or water there is an endothermic reaction produced which is explained by the water-gas reaction $C+H_2O=CO+H_2$. This we find is not necessary when the equivalent endothermic reaction can be produced in another manner which we provide. The gas exhausting from an average automobile gas engine contains unburned combustible constituents as shown by the following analysis:

$$\begin{array}{c} \text{Per cent} \\ \text{by volume} \\ CO_2 = 10.2 \\ O_2 = 0.3 \\ CO = 6.4 \\ H_2 = 2.4 \\ CH_4 = 0.8 \\ N_2 = 79.9 \\ \hline 100.0 \end{array}$$

When this gas is recirculated through a hot fuel bed the combustible portion is recovered and the $CO_2$ is again converted into CO by the following endothermic reaction: $CO_2 + C = 2CO$. Therefore the hotter the exhaust gas and the hotter the air supplied to the generator the greater is the possible ratio of the exhaust-gas to air, supplied to the generator. The air produces gas according to the well known producer-gas reaction $2C + O_2 = 2CO$ and generates heat in the fuel bed. We utilize these reactions in our apparatus and process in definite proportions.

In Figure 1 is shown a plan of the producer and accessories applied to an automobile chassis.

Figure 2 is a front elevation of the producer with a portion of the wall cut away to show the interior in section.

Figure 3 is an end elevation of the producer with the lower portion of casing cut away to show the interior in section.

In Figure 1, 1 is the gas producer with a fuel charging door 2. A tar and dust collecting chamber is shown at 3; 4 is a heat-exchanger for heating air by the sensible heat of the producer gas. The mixing chamber where air is mixed with the producer gas is shown at 5. The throttle controlling the producer-gas-air mixture admitted to engine 7 is shown at 6. 8 is an exhaust pipe conducting the engine exhaust-gas to the heat exchanger 9 where it also heats air supplied to the gas producer. 10 is a control device for regulating the relative proportions of air and exhaust gas admitted to the gas-producer; the exit for surplus exhaust gas is shown at 11. 12 and 13 are funnel shaped air inlets for supplying air to the producer through the heat exchangers.

A means of circulating the water for cooling said gas-collecting conduit is not shown since the patent is not claimed on this connection, but a simple means consists in connecting it in the water circulating system of the engine. The air offtakes from the heat exchangers are connected or combined as one conduit at 17. The exhaust gas enters the air conduit at 16 and the mixture or air alone, as desired, enters the producer through conduit 15. A quick opening vent valve for producing a slight natural draft during stand-by periods is shown at 18 on top of this producer. A supercharger for producing a suction on the system and supplying air and gas to the engine under controlled pressure is shown at 29; the valve vent 30 is used—(opened)— when the supercharger is used to create a draft for starting the fire in the producer.

Valves for controlling air supplied to the producer through the heat exchangers 4 and 9 are shown at 31 and 32. The valve for controlling the air supplied to the engine is shown at 33, and the air intake at 34. The auxiliary fuel supply tank is shown at 35 connected to the engine by fuel supply line 36, with valve 37 and carbureter 38. A valve in the producer gas supply line to engine is shown at 39. 40 is a converging gas conduit leading from producer to heat exchanger 4; 41 is a converging, finned radiator-conduit.

In Figure 2 the same system of numbering is employed; 14 is water cooled gas-collecting conduit connecting with the tar and dust collecting chamber 3. The quick-opening clamps for holding fuel charging door are shown at 19. Grate bars 20 are protected with the substantially spherical refractory elements 21. The fuel 22 is walled in by refractory generator pot 23 which is cushion supported without suspension by a heat insulating material 24 which is incased and retained in place by the jacket 25 which has an air chamber 26 around it. Air holes are shown in the outer casing at 28 for cooling the wall 25 by natural draft. A quick-opening ash-cleanout door is shown at 27.

In Figure 3 the same system of numbering is used and like numerals refer to the same parts as in Figures 1 and 2.

Referring to Figure 1 the operation is briefly as follows: Fuel such as charcoal, coke prepared solid fuels or the like is charged into producer 1 and ignited. The top is closed and supercharger 29 is operated with valves 30 and 39 open and a draft is thus created. When the temperature is suitably high in the fuel bed, valve 30 is closed and 18 is opened and the producer is left on natural draft until the engine is ready to start. The engine 7 is started in the usual manner by a starting device, not shown for simplicity, whereupon air is caused to pass through 12 and 13 into the heat exchangers 4 and 9 into 17 and through 15 to the gas producer 1.

The gas resulting from the introduction of air into the fuel mass from beneath is drawn by suction through the gas offtake to the tar and dust collecting chamber 3, heat exchanger 4 mixing chamber 5, through valve 6 into supercharger 29.

Air is also simultaneously drawn into supercharger 29 through air inlet 34 and through valve 6 and the mixed air and gas are forced into the engine 7 under pressure by said supercharger 29.

The exhaust gas from the engine is caused to pass out through exhaust pipe 8 and heat exchanger 9 to control valve 10 which is so regulated that a predetermined and definite proportion of said exhaust gas passes through 16 into the air intake 15; the remainder of said exhaust gas exhausting through port 11.

In the ordinary operation of a gas producer it is not desirable to use preheated air because of the high temperatures prevailing with such use and the accompanying heat loss and the damage to the producer; an exception to this being in the by-product producer wherein a large excess of steam is used. In the latter instance the producer efficiency is very low.

We find that because of the appreciable amount of combustible matter in the exhaust gas, as well as for other reasons, it is highly desirable to recirculate as much of the exhaust gas as possible through the fuel bed.

Since the chemical reaction of the exhaust gas with the incandescent fuel in the producer is largely an endothermic reaction, the percentage by volume of such gas which can be introduced with the air depends upon the temperature of these gases as they enter said fuel bed.

Obviously, the higher the temperature of said gases entering the producer, the greater the percentage of exhaust gas which may be introduced with the air. In our system then it will be noted, a marked increase in the efficiency is obtained by the combined use of exhaust gas and heat exchangers.

We find that under favorable conditions we can use as much as 25 per cent exhaust gas in the air-exhaust-gas mixture. The temperature of the combustible gas leaving the producer is not appreciably different from the temperatures of the air and exhaust gas supplied to the producer.

The thermal chemistry of the process under these conditions is very simple and is substantially as follows:

$C + CO_2 = 2CO - 10,220$ B. T. U. per pound of carbon; chemically the equation is:

(A) 12 pounds carbon plus 44 pounds of $CO_2 = 56$ pounds of CO and the heat absorbed in the reaction is $12 \times 10,220$ or 122,640 B. T. U. Now, it is because of this heat absorption that air must be supplied to the producer, the oxygen of the air combines with the carbon to form CO with the liberation of heat and obviously sufficient heat must be supplied by this exothermic reaction to furnish the heat absorbed in reaction (A) namely 122,640 B. T. U. The heat liberated by the chief exothermic reaction is: (B) 24 pounds $C + 32$ pounds $O_2 = 56$ pounds $CO + 104,400$ B. T. U.

By simple arithmetic it develops that for every twelve pounds of carbon consumed by reaction (A) there must be 28.2 pounds consumed by reaction (B) to make the heat input into the fuel bed equal the heat absorbed. There is a small amount of heat generated in the fuel bed according to reaction (C).

(C) 12 pounds carbon + 32 pounds oxygen = 44 pounds of carbon dioxide ($CO_2$) plus 174,480 B. T. U. This reaction takes place to a limited extent only, but it supplies sufficient heat to offset radiation loss but of course the efficiency decreases as the percentage amount of gas formed by this reaction increases. Accordingly, by the use of preheated air and hot exhaust gas, it is possible to use as much as 28 pounds of generator fuel by reaction (B) during the consumption of 12 pounds of fuel by reaction (A). It will be noted that in the consumption and gasification of the 40 pounds (12+28) of generator fuel, 44 pounds of $CO_2$ were returned to the generator or the equivalent of 12 pounds of carbon. Thus, of carbon content of the gas supplied to the engine there may be as much as $$\frac{12 \times 100}{40 + 12}$$

or 23.1 percent supplied by recirculation. The exact percentage amount of recirculation is dependent upon the temperatures of the air and exhaust gas supplied to the producer and the temperature of the gas leaving the producer; the higher the former and the lower the latter, the greater is the possible amount of recirculation.

Since approximately one-fourth of the total amount of exhaust gas is all that is recirculated, it will appear that there is available for use in the heat exchanger 9 a volume of hot exhaust gas at least three times as great as the volume of air to be heated, and therefore a high thermal efficiency in the heat exchanger 9 is not necessary for preheating the air up to a temperature approaching that of the exhaust gas.

For this reason it is sometimes desirable not to use heat exchanger 4 to any appreciable extent.

Because it is highly desirable to supply the engine with cooled gas and because heat exchanger 4, Figure 1 may not be used to a sufficient extent to cool the gas, a finned conduit, serving as a heat-radiator and a gas cooler is supplied as shown at (41), Figure 1. This conduit is preferably of tapering or converging shape, as also is conduit 40 decreasing in sectional area, along the path of travel of the gas. This, we believe, to be important and new, and has for its object the prevention of the settling of particles contained in the gas, which may have passed through the dust collector. Expressed differently the lineal velocity of the gas is not allowed to decrease as the gas cools.

Alluding again to Figure 1, the amount of air which is supplied to the heat exchangers 4 and 9 is governed by the control-valves 31 and 32. When the supercharger 29 is in use, the air is drawn into openings 12 and 13 through valves 31 and 32 by the suction of said supercharger; however, when a supercharger is not provided in the system, air is drawn in through 12 and 13 largely by the suction of the engine, in which instance it is desirable to utilize the static head due to the velocity of travel of said motor vehicle in the funnel heads shown at 12 and 13.

With the use of preheated air and hot exhaust gas and without the use of moisture or steam in the air supply to the producer, we are enabled to obtain an effect and efficiency and a rate of combustion which we believe has not heretofore been obtained, and upon which we ask patent protection. We have succeeded in gasifying solid fuel in our producer at a rate greater than 100 pounds of said fuel per square foot of grate area per hour. This performance, in conjunction with the fact that no water-supply-tank is necessary for supplying water to the producer, makes it possible for us to design our producer system with a high capacity per unit of weight; an essential feature for use on automotive mechanisms.

The fuel storage magazine which is essentially that portion of the producer above the gas collecting conduit 14 of Figure 2 has more than double the capacity of the generator proper; this we find is a most desirable feature for producers used to furnish power for automotive vehicles; particularly is it necessary when using fuels having a low specific gravity such as charcoal, because of the desirability of carrying sufficient fuel for an average one-day run.

We find that it is necessary to insulate the generator pot and also to so support said pot so that the deleterious effects of shock and vibration will be minimized. We find that it is possible by the proper selection of insulating material to accomplish both of these purposes; namely by the selection of a more or less elastic insulating material into which the generator pot is fitted, the latter is both insulated and cushion supported. To do this it is necessary that the elastic insulation be held firmly in place. For this reason, among others, we have provided the jacket shown at 25 in Figures 2 and 3. We realize that cushion-suspended generators have been suggested for this purpose; but experience has shown that a refractory non-metal generator pot withstands the shocks common to producers used on auto-motive mechanisms more readily when cushion supported than when cushion suspended. The generator pot which is preferably made in one piece and shown at 23 in Figures 2 and 3 may be made of carborundum or other refractory or like nature or of special heat and oxygen-resisting metals.

The insulation for insulating and cushion-supporting the generator pot shown at 24, Figures 2 and 3 may be kieselguhr, asbestos, or other elastic or shock-absorbing fire-resistant material. A jacket space, or chamber 26 is created between the metal jacket 25 and the circumscribing producer-shell 1. In practice we build small producers without superheaters and use said jacket for superheating ingoing air to producer. Large producers for heavy vehicles are supplied with superheaters, consequently the jacket is merely vented as at 28 to air-cool the jacket and shell with the air circulated by natural draft.

We find in practice that ordinary grate-bars will not stand up under the temperature prevailing with high rates of combustion, and have overcome this difficulty by providing oval or substantially spherical refractory elements as shown at 21, Figure 2 which rest upon the grate bars 20 and contact them in but few points. These elements not only protect the grate from damage by fire; but by their rolling about and sliding contact with one another form an automatic means of discharging ash through the grates; particularly when fuels or low ash content such as charcoal or oil coke are used. This feature, we find is necessary when using preheated air under the grates and we believe this combination to be new.

It is found that during the stand-by periods, only a very small amount of air need be introduced into the fuel bed to provide sufficient heat for maintaining said fuel in a suitable state of ignition for gas-making purposes. The quantity of air needed for this purpose is supplied by creating a slight natural draft through the fuel bed, said draft being used only during stand-by periods. This draft is created by opening the quick-opening valve shown at 18 in Figure 2 which is provided for this purpose.

The course of the air used during the stand-by period is through the openings 12 and 13, the heat exchangers 4 and 9, conduits 17 and 15, and into the fuel from beneath the grates, the products of combustion passing out through 18.

The supercharger shown at 29, Figure 1, is not illustrated in detail because patent is not claimed for it as such. It can be either a centrifugal type or positive type blower which is capable of creating sufficient vacuum to draw the air and gas through the producer system, as well as the air required for combustion, through the throttle valve 6, and capable of discharging the mixture of air and gas into the engine under greater than atmospheric pressure.

It is found that whereas charcoal and certain prepared fuels are satisfactory fuels for the production of producer gas, experience has shown that frequently there is entrained in the gas leaving the producer, appreciable amounts of tar, dust or carbon particles which should be removed. A means for removing such entrained matter is provided in the tar and dust collecting chamber 3 Figure 1. This chamber is not shown in detail for the reason that patent is not claimed on it as such, for the reason that any one of a number of approved types are suitable for this purpose. A connecting pipe with a valve 30 is provided to connect the gas intake manifold to the engine exhaust, which is used in kindling a fire in the producer. When the supercharger is used to kindle a new fire in the producer, valve 30 is opened and the supercharger may be operated by hand, causing the air to flow into the producer and the products of combustion from the producer to flow through the valve 30 to the exhaust pipe of the engine.

It is obvious, according to Figure 1 that by proper control of valves 31 and 32 the relative amount of air admitted through the heat exchangers 4 and 9 may be altered at will. The relative amounts of exhaust gas discharged through 11, or introduced through 16 into the producer may be altered at will by proper control of the valve 10. The relative amount of air and combustible gas supplied to the engine by the supercharger 29 can be controlled by the proper control of valve 33.

The total amount of gas and air mixture which is supplied to the engine is controlled by the throttle valve 6.

The producer, as we have developed it, is suitable for use not only on automotive vehicles, but may also be applied to boats propelled by gas engines, tractors, railroad cars, portable engines and other applications for which a relative light weight, high duty gas producer is desired.

The term "automotive mechanism," as used in this application alludes to automobiles, tractors, railroad motor cars, boats and the like.

By the term "supercharger" is meant a gas pump capable of withdrawing the gas from the producer by suction and forcing it into the engine under pressure.

By the term "air-gas" is meant mixtures of producer gas and air.

We claim:

1. In a gas-producer for generating combustible gas from solid fuel, adapted for use on automotive mechanisms and suitably connected to a gas engine to supply it with power-gas, in combination, a plurality of means for separately preheating the air supplied to said producer and means for supplying hot exhaust gas to said producer mixed with said air, with means for controlling the relative amounts of said air and exhaust gas thus supplied and means for controlling and instantly varying the amount of air-preheating.

2. In a system comprising a producer-gas generating-unit suitably connected with a gas engine of an automotive mechanism for supplying it with power-gas, in combination, means for separately preheating air supplied to said producer a controllable amount, means for introducing engine exhaust gas with the air supplied to said producer with means for controlling the relative amounts of said air and said exhaust gas supplied to said producer comprising a conduit leading from the engine exhaust-parts to the air intake to said producer having a control valve through which the exhaust gas may be caused to pass, said means for preheating said air comprising heat exchangers adapted to preheat said air by the sensible heat of said exhaust-gas only, by the sensible heat of the producer gas only, or by both.

3. In combination with a system comprising a producer-gas generating-unit suitably connected with the gas engine of an automotive vehicle for supplying it with power-gas, means for supplying mixed hot air and hot engine-exhaust-gas to the fuel bed of said gas-generating-unit, with means for separately heating said air with part of the sensible heat of all of the exhaust gas, and with the sensible heat of the producer gas, and means for instantly varying the proportion of air in said mixed air and gas.

4. In combination with the gas engine of an automotive mechanism, a producer-gas generating-unit suitably connected to said engine for supplying it with power-gas, a common means of drawing air into the fuel bed of said producer and supplying said engine with a mixture of gas and air, means for controlling the relative amounts of air and gas supplied to said engine, a throttle valve in this air-gas intake line for controlling the total amount of air-gas mixtures supplied said engine, means for separately preheating different portions of the air supplied to said producer utilizing the sensible heat of the engine exhaust gas and of the hot producer gas consisting in heat exchangers in the air supply lines to said producer through which the hot gases are caused to pass in parallel, means for controlling and varying the relative volumes of said portions of air supplied to the separate preheaters, means for introducing into said producer along with the air a controlled amount of engine exhaust-gas and means for cooling the producer gas prior to its entry into said engine.

5. In a system comprising a producer-gas generating-unit suitably connected with a gas engine of an automotive mechanism for supplying it with power-gas, with a supercharger as a means for drawing the gas from producer and supplying it to said engine, means for utilizing said supercharger to remove products of combustion from producer when engine is not in use, said means comprising a conduit having a valve therein leading from the intake manifold of said engine to the exhaust manifold of said engine.

6. In a system comprising a producer-gas generating-unit suitably connected with a gas engine of an automotive mechanism for supplying it with power-gas, heat-transfer means with valves located in the air and gas lines adapted, through the operation of said valves, to preheat the producer-air utilizing the sensible heat of the producer gas only, the sensible heat of the engine exhaust gas only or the sensible heat of both gases, having means for keeping said air and gases separate therein.

7. In combination with a system comprising a producer-gas generating-unit suitably connected to the combustion engine of an automotive vehicle for supplying it with power-gas, means for recirculating the maximum percentage of the carbon of the gas through the fuel bed of said gas-generating-unit simultaneously maintaining said fuel bed in an incandescent state by combustion, comprising means for conducting all of said exhaust gas through a heat exchanger, means for conducting part of it into the gas-producer fuel-bed means for preheating the air supplied said fuel bed utilizing some of the sensible heat of substantially all of the engine-exhaust-gas and some of the sensible heat of the producer gas, and means for instantly varying the proportions of the producer air passing through the different air-heaters.

8. In combination with a system comprising a producer-gas generating-unit suitably connected to the combustion engine of an automotive vehicle for supplying it with power-gas, means for recirculating the maximum percentage of the carbon of the gas through the fuel-bed of said gas-generating-unit simultaneously maintaining said fuel-bed in a state of incandescence by combustion, comprising means for conducting all of the exhaust gas through a heat exchanger, means for conducting part of it into the fuel-bed of said gas-generating-unit, means for preheating the air supplied said fuel-bed utilizing some of the sensible heat of all of the exhaust gas and producer gas, means for supplying only said preheated air and exhaust gas to said fuel-bed for generating said power-gas, and means for instantly varying the proportions of the producer air passing through the different air-heaters.

9. In a producer-gas power-unit comprising a gas producer adaptable for use on automotive mechanisms and suitably connected to the combustion engine of an automotive vehicle to supply it with power gas, in combination, means of preheating a portion of the air supplied to producer simultaneously cooling the producer gas, and means of preheating another portion of said air by a portion of the sensible heat of all of the engine exhaust-gas, said means comprising heat exchangers, one located in the exhaust-gas line and one in the producer-gas line; said heat exchangers being adapted to preheat said air, having valves adapted to control the relative proportions of said air heated in each of said heat exchangers.

10. In a producer-gas power-unit comprising a gas producer adaptable for use on automotive mechanisms and suitably connected to the gas engine of an automotive vehicle to supply it with power-gas, in combination, common means for cooling producer gas and preheating a portion of the air supplied to producer, common means for preheating another portion of said air and recovering some of the waste sensible heat of the engine exhaust-gas, means for mixing and supplying said preheated air with a portion of said exhaust-gas to said gas producer, means for quickly controlling the relative amounts of said air and said exhaust-gas thus supplied, and means for quickly varying the relative amounts of producer-air heated in the different heat exchangers.

WILLIAM W. ODELL.
EARL N. PERCY.